United States Patent
Elofsson et al.

(10) Patent No.: US 8,448,509 B2
(45) Date of Patent: May 28, 2013

(54) DEVICE AND METHOD FOR DETERMINATION REGARDING THE LIQUID LEVEL IN CONTAINERS

(75) Inventors: Rasmus Elofsson, Göteborg (SE); Anders Meiton, Frölunda (SE)

(73) Assignee: Feldt & Meiton Marin AB, Västra Frölunda (SE)

( * ) Notice: Subject to any disclaimer, the term of this patent is extended or adjusted under 35 U.S.C. 154(b) by 417 days.

(21) Appl. No.: 12/664,836

(22) PCT Filed: Jun. 19, 2008

(86) PCT No.: PCT/SE2008/050738
§ 371 (c)(1),
(2), (4) Date: Apr. 13, 2010

(87) PCT Pub. No.: WO2008/156423
PCT Pub. Date: Dec. 24, 2008

(65) Prior Publication Data
US 2010/0206066 A1    Aug. 19, 2010

(30) Foreign Application Priority Data
Jun. 21, 2007    (SE) .................................... 0701520

(51) Int. Cl.
*G01F 23/00* (2006.01)
(52) U.S. Cl.
USPC ....................................................... 73/290 V
(58) Field of Classification Search
USPC .............................................. 73/290 V, 290 R
See application file for complete search history.

(56) References Cited

U.S. PATENT DOCUMENTS

| | | | |
|---|---|---|---|
| 4,107,994 A | 8/1978 | Sogo | |
| 5,035,140 A | 7/1991 | Daniels et al. | |
| 5,264,831 A | 11/1993 | Pfeiffer | |
| 5,608,164 A * | 3/1997 | MacLauchlan | 73/599 |
| 5,836,192 A | 11/1998 | Getman et al. | |
| 6,176,132 B1 * | 1/2001 | MacLauchlan | 73/290 V |
| 6,925,868 B2 * | 8/2005 | Young et al. | 73/290 V |
| 7,216,536 B2 * | 5/2007 | Young et al. | 73/290 V |
| 7,424,824 B2 * | 9/2008 | Usui et al. | 73/290 V |
| 7,578,183 B2 * | 8/2009 | Young et al. | 73/290 V |
| 7,805,991 B2 * | 10/2010 | Usui et al. | 73/290 V |
| 2006/0042386 A1 | 3/2006 | Young et al. | |
| 2006/0137447 A1 * | 6/2006 | Usui et al. | 73/290 V |

FOREIGN PATENT DOCUMENTS

| | | |
|---|---|---|
| CH | 683375 A5 | 2/1994 |
| GB | 1531729 A1 | 11/1978 |
| JP | 51140362 A | 12/1976 |
| JP | 5107098 A | 4/1993 |
| JP | 7333037 A | 12/1995 |

OTHER PUBLICATIONS

Office Action dated Jan. 4, 2013, in connection with related Japanese Application No. JP 2010-513161.

* cited by examiner

*Primary Examiner* — Hezron E Williams
*Assistant Examiner* — Rodney T Frank
(74) *Attorney, Agent, or Firm* — Downs Rachlin Martin PLLC

(57) ABSTRACT

A measurement device (3) and a method for determination regarding the liquid level in a container (1) with a wall (2) is described. A force is applied in a point on the wall on the outside of the container (1) and the resulting impulse response is measured and calculated. From the impulse response a determination is made regarding the liquid level in the container.

28 Claims, 3 Drawing Sheets

DEVICE AND METHOD FOR DETERMINATION REGARDING THE LIQUID LEVEL IN CONTAINERS

TECHNICAL FIELD

The present invention relates to a device and a method for determination regarding the liquid level in a container. Primarily, the present invention relates to a device and a method for measurement of the liquid level in a septic tank.

DESCRIPTION OF THE PRIOR ART

Septic tanks are used for storage of the waste from for example toilets which for different reasons cannot be connected to the sewage system, such as for example toilets in summer cottages and pleasure boats. When the septic tank is full the waste may be removed using specially arranged equipment which for example may be arranged on a tank lorry. In summer cottages the septic tank may often be arranged so that the liquid level easily may be checked for example through a hole into the tank. In pleasure boats the space is often limited which makes the installation more complicated. Furthermore, the movements of the boat during travel results in that it is required that the septic tank is not to leak. If the septic tank would be full and eventually start to leak the waste in the septic tank may flow into the ocean or into the pleasure boat. Despite this many pleasure boats lack reliable equipment for measurement of the liquid level in the septic tank. In many countries it has also become required by law that all pleasure boats equipped with a toilet must be equipped with a septic tank which has led to increasing numbers of boat owners to notice the problem with measurement of the liquid level in the septic tank.

As an example on the equipment which has been available to measure the liquid level in septic tanks, measurement equipment which use a float arranged inside the septic tank may be mentioned. The float is in turn arranged so that the position of the float inside the septic tank may easily be measured. However, it has proved to be difficult to achieve reliable measurements of the liquid level in septic tanks using floats.

It would be desirable to measure the liquid level in septic tanks from the outside without introducing any parts into the septic tank.

It is previously known to measure the liquid level in tanks from the outside from for example the U.S. Pat. No. 6,631,639. In said patent a piezoelectric transmitter and a piezoelectric receiver are arranged at a distance from each other on a tank wall. The transmitter excites a vibration pulse in the tank wall, which vibration pulse is detected by the receiver. By measuring the change in the phase velocity of the vibration wave when it moves through the tank wall it is possible to determine whether there is liquid in the tank between the transmitter and the receiver. However, it is a relatively complicated solution which is described in said patent. Furthermore, it has proven to be difficult to determine the liquid level in septic tanks with the solution which is described in said patent, which may be due to the fact that the content in septic tanks often has a non-homogenous composition.

SUMMARY OF THE INVENTION

An object of the present invention is to provide a device and a method for determination regarding the liquid level in a container from the outside of the container, which device and which method are alternatives to solutions according to the prior art.

A further object of the present invention is to provide a device and a method for determination regarding the liquid level in a container from the outside of the container, which device and which method at least partly solves one of the problems with the prior art.

Primarily the present invention relates to determination regarding the liquid level in containers of metal, such as aluminium and stainless steel, but it may also be used on containers of other materials.

At least one of these objects is fulfilled with a device and a method according to the appended independent claims.

Further advantages are provided with the features of the dependent claims.

According to a first aspect of the present invention a measurement device for determination regarding the liquid level in a container with a wall is provided. The measurement device comprises at least a first actuator arranged on a corresponding level on the wall, which actuator which comprises an influence part which is arranged for influencing the wall on the outside of the container. The measurement device further comprises a vibration sensor for each one of said at least one actuator, for measurement of the vibrations in the wall, and a control unit, which is connected to said at least one actuator and the vibration sensors, and which is arranged to apply a predetermined drive signal to the actuators, which drive signal makes the influence parts influence the wall with an oscillating force. The vibration sensors are arranged fixed in relation to the corresponding influence parts so that the vibration sensors moves in the same way as the influence parts. The measurement device is arranged to receive at least one resulting measurement signal from each one of the vibration sensors, which measurement signals depend on the size of the vibrations, and to compare the measurement signals with earlier measured measurement signals in order to make a determination regarding the liquid level in the container. The measurement device is characterized in that the control unit is arranged to determine, using the predetermined drive signal and the measured vibration signals, a system response for the container and to make, from the determined response and at least one earlier measured response with a known liquid level, a determination regarding the liquid level in the container, wherein the system response is one of a frequency reaction, a frequency response and an impulse response.

It is possible to determine directly from the measured vibration signal whether there is liquid at the level on which the actuator is positioned. However, a more robust result is provided if the impulse response is calculated and the calculated impulse response is used for the comparison.

With a measurement device according to the invention it is possible to determine in a reliable way whether there is liquid in the container at the level of the actuator.

A measurement device according to the invention gives reliable measurement results also when the contents in the container is non-homogenous which may be the case in septic tanks.

A measurement device according to the invention is especially advantageous to use in the case that the container is made of steel. When the container is made of steel it is not possible to use capacitive measuring apparatuses.

The amplitude of the system response may be used to determine whether there is liquid in the container at the level of the wall that some of said at least one actuator is arranged at. This has shown to be a parameter of the system response that has a strong correlation to whether there is liquid in the container at the level on which the actuator is arranged. By amplitude is in this context meant for example the mean amplitude for a response measured over a frequency interval or a time interval such as RMS-amplitude over a frequency interval or a time interval. As an alternative to observe the amplitude for the response the energy contents or the square of the amplitude may be observed.

The system response below a predetermined interval may be used to perform a determination regarding the liquid level in the container. By not arbitrarily choosing an amplitude in the system response but using a predetermined interval it is possible to further increase the robustness and safety to make a correct determination. The chosen interval may be adapted to the current application. Depending on which system response that is used the interval may be a frequency interval or a time interval.

In case the system response is comprised by the impulse response said predetermined interval may preferably be from the beginning of the impulse response until between 0.5 and 20 milliseconds into the impulse response, preferably 1-10 milliseconds into the impulse response and most preferred 1-5 milliseconds into the impulse response.

The actuator may be arranged to influence the wall with a force perpendicular to the wall. Such an arrangement of the actuator gives the strongest vibration signal and thus, leads to a safe measurement of the impulse response.

The actuator may comprise a moving part which is arranged to move in relation to the influence part in order to give rise to vibrations. Such an arrangement of the actuator enables transfer of large forces to the wall.

The influence part may comprise an electromagnet in the magnetic field of which the moving part is arranged to move. This is in itself a well known way of creating vibrations and is used for example in loudspeakers.

Alternatively the actuator may be arranged to affect the wall with a force parallelly to the wall. Such an arrangement of the actuator may be favourable in some cases.

An example on when it is favourable to let the actuator be arranged to influence the wall with a force parallelly to the wall is when the influence part comprises a piezoelectric crystal. In such a case it is hard to otherwise transfer sufficiently large forces to the wall. Piezoelectric crystals may be favourable to use due to the fact that they do not comprise any movable parts.

The vibration sensor may be an accelerometer. This is the most common type of vibration sensor. There are also other types of vibrations sensors which are known to men skilled in the art and which could be used instead.

The measurement signal may be a voltage over the accelerometer. Alternatively the measurement signal could for example be the current to the accelerometer, a magnetic field or any other measurable quantity which is influenced by the movement of the accelerometer.

As an alternative to letting the vibration sensor being comprised of an accelerometer the vibration sensor may be comprised of the influence part in the form of the piezoelectric crystal. In this case the measurement signals are preferably comprised of the current to the piezoelectric crystal and the voltage over the piezoelectric crystal. From the voltage and the current the impedance of the piezoelectric crystal may be calculated. The impedance may then be used as a system response.

The determination regarding the liquid level in the container may be a determination of whether there is liquid in the container at the level on the wall on which one of said at least one actuators is arranged. It is when the liquid level passes said level that the largest difference is seen in the system response. In such cases the measurement device is used primarily as a filling alarm in order to remind a user that it is time to empty the tank.

Alternatively, the determination regarding the liquid level in the container may be a determination of the liquid level in the container. This is possible at least for some placements of the actuator while it may be more difficult for other placements of the actuator due to the system response not being influenced much for some changes in the liquid level at a distance from the level of the actuator.

The measurement device may comprise a plurality of actuators which are arranged to be fastened at different heights on the wall of the container. With such a measurement device it becomes possible to determine in a more reliable way on which level the liquid surface is.

When the measurement device comprises a plurality of actuators the control unit may thus be arranged to determine from the vibration signals from the actuators at which height the liquid surface is.

When the measurement device comprises a plurality of actuators the control unit may be arranged to determine which actuator the liquid surface is closest to. Possibly the control unit may also determine where between two actuators that the liquid surface is situated.

According to a second aspect of the present invention a container is provided on which there is arranged a measurement device according to the first aspect of the present invention. Such a container may for example be a septic tank.

According to a third aspect of the present invention a pleasure boat is provided, which comprises a septic tank on which there is arranged a measurement device according to the first aspect of the present invention.

According to a fourth aspect of the present invention a method is provided for measurement of the liquid level in a container with a wall. The method comprises the steps of applying to an actuator, which is arranged on the wall on the outside of the container, a predetermined drive signal which makes the actuator influence the wall with an oscillating force in at least one point on the wall. The method is characterized in that it also comprises the steps of measuring at least one measurement signal which is a measure on vibrations in the wall in said at least one point, to calculate the system response for the container starting from the vibration signal, and to compare the measurement signals with earlier measured measurement signals in order to make a determination regarding the liquid level in the container starting from the system response.

A method according to the fourth aspect of the present invention gives the corresponding advantages as has been described in connection to the measurement device according to the first aspect of the present invention.

The method may comprise the step of calculating the system response for the container starting from the measurement signal, wherein the determination regarding the liquid level in the container is made starting from the system response. This gives the same advantages as has been described in connection to the corresponding feature for the measurement device according to the first aspect of the present invention.

The determination regarding the liquid level in the container may be made starting from the amplitude of the system response. This gives the same advantages as has been described in connection to the corresponding feature for the measurement device according to the first aspect of the present invention.

The amplitude may be based on the amplitude during a predetermined interval of the system response. Depending on which system response that is used the interval may be a frequency interval or a time interval.

In case the system response is comprised of the impulse response said predetermined interval may be from the beginning of the impulse response until between 0.5 and 20 milliseconds into the impulse response, preferably 1-10 milliseconds into the impulse response and most preferred 1-5 milliseconds into the impulse response. This gives the same advantages as has been described in connection to the corresponding feature for the measurement device according to the first aspect of the present invention.

The actuator may influence the wall with a force perpendicularly to the wall. In such a case the drive signal may have a frequency content in the interval 100-1200 Hz. This has proved to give reliable measurements of the system response.

In some cases it may be advantageous to let the actuator comprise an influence part in the form of a piezoelectric crystal. In such a case the drive signal preferably has a frequency content in the interval 300-18000 Hz. This has proved to give reliable measurements of the system response when the force is applied in the plane of the wall as is necessary when a piezoelectric crystal is used.

In the following preferred embodiments of the invention will be described with reference to the appended drawings.

SHORT DESCRIPTION OF THE DRAWINGS

DESCRIPTION OF PREFERRED EMBODIMENTS

Figure 1:
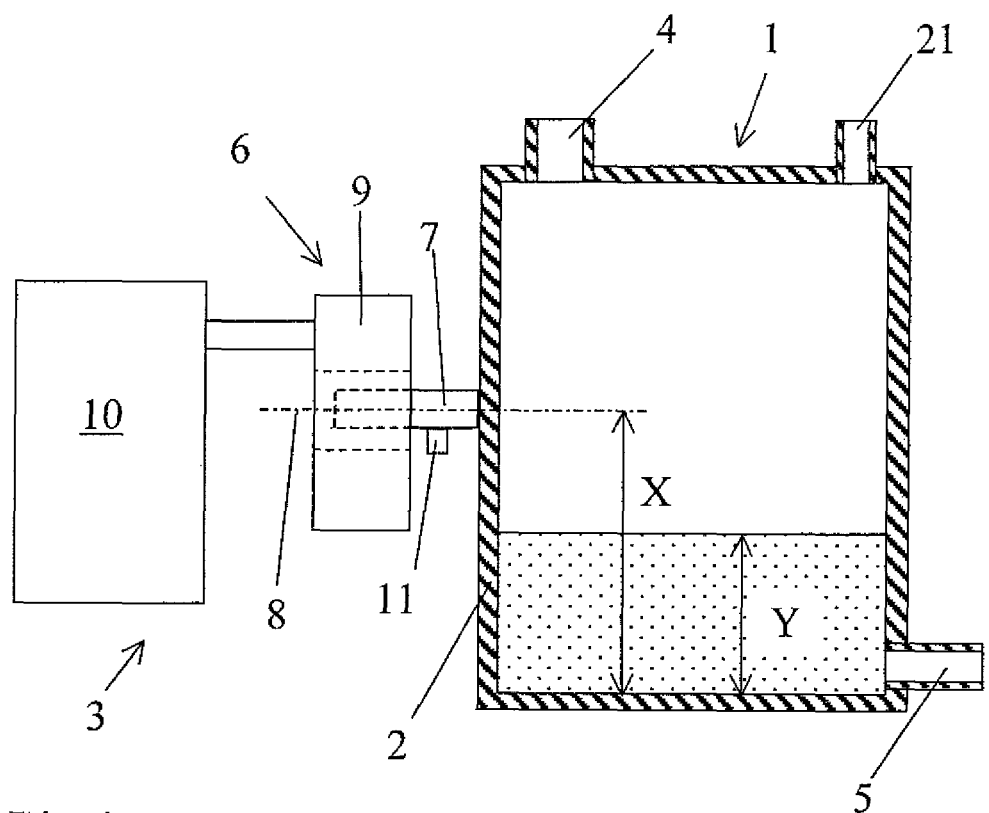
FIG. 1 shows schematically a container with a device according to an embodiment of the present invention for determination of the liquid level in the container.

In the following description of preferred embodiments of the invention similar features in the different figures will be denoted by the same reference numeral.

FIG. 1 shows schematically in a side view a container 1 with a wall 2 and a measurement device 3 according to an embodiment of the present invention for determination of the liquid level in the container 1. The container 1 comprises an inlet 4 for sewage from for example a toilet (not shown) and an outlet 5 for emptying the container 1. The measurement device 3 for determination of the liquid level in the container 1 comprises an actuator 6 which comprises an influence part 7 with a length axis 8. The length axis 8 is also the central axis for the influence part 7 and is arranged on the level X. The liquid surface is at the level Y. The actuator 6 comprises in the shown embodiment a movement part 9 which is movably suspended in relation to the influence part 7 which comprises an electromagnet. In the figure it is not shown in detail how the suspension of the movement part 9 is arranged. However, similar suspensions are known from ordinary loudspeaker elements. In the movement part 9 there is arranged a permanent magnet 15 which can be influenced by the electromagnet in the influence part 7 to move back and forth parallelly to the length axis 8 when an oscillating drive signal is applied to the actuator 6. On the influence part 7 there is arranged a vibration sensor 11 for measurement of the vibrations of the wall 2 of the container 1. By the vibration sensor 11 being arranged on the influence part 7 the vibration sensor will vibrate in the same way as the influence part 7 which means that the vibration sensor 11 will measure the vibrations in the same point of the wall 2 as the actuator 6 transfers force into the wall 2. The vibration sensor 11 and the actuator 6 are both connected to a control unit 10 which is arranged to apply a drive signal to the actuator 6 and to receive a measurement signal from the vibration sensor 11, which measurement signal for example may be the voltage over the vibration sensor 11.

Figure 2:
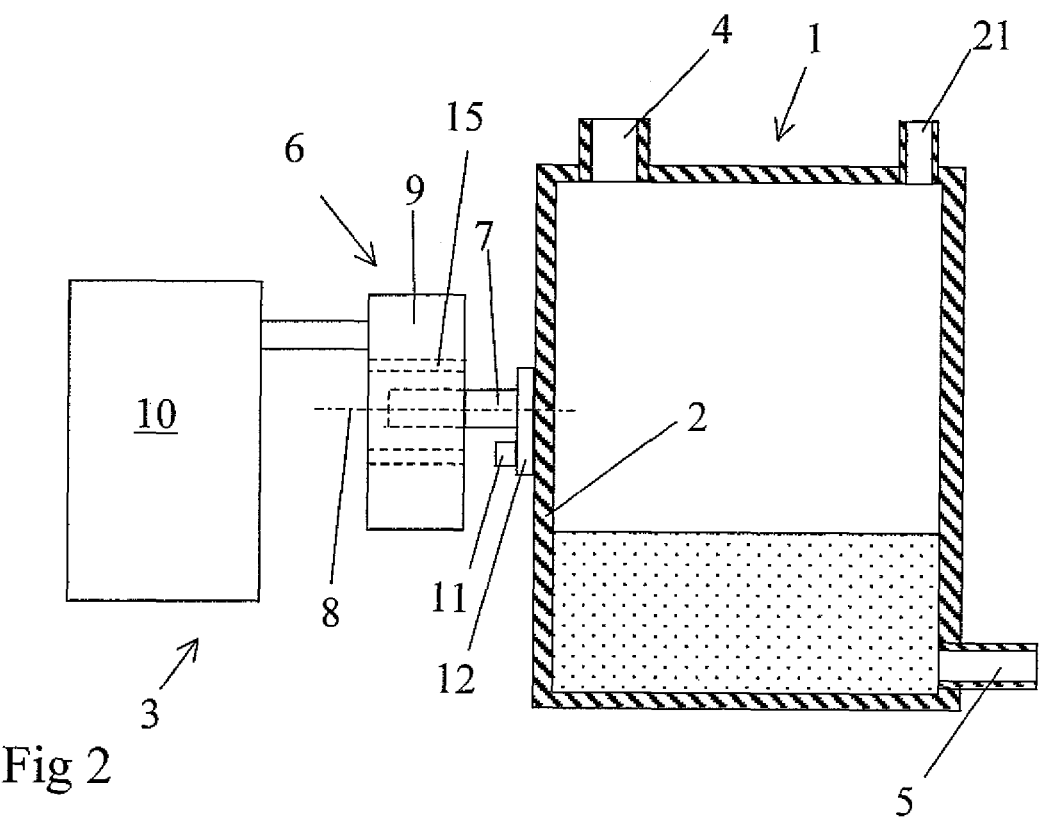
FIG. 2 shows in larger detail the device for determination of the liquid level according to an embodiment of the present invention.

It is not necessary to have the vibration sensor arranged on the influence part 7, as is shown in FIG. 1. In FIG. 2 a measurement device 3 for determination of the liquid level in the container 1 according to an alternative embodiment of the present invention is shown in a side view. The measurement device 3 comprises an actuator 6 which comprises an influence part 7. The influence part 7 is arranged fixed in a plate 12 which in turn is arranged fixed in the wall 2. On the plate 12 there is arranged a vibration sensor 9. The plate 12 is sufficiently stiff for the vibration sensor 9 to vibrate in the same way as the influence part 7. The containers in FIG. 1 and FIG. 2 also comprise an overpressure outlet 21 in order to prevent overpressure in the container 1.

As an alternative to the actuators 6 shown in FIG. 1 and FIG. 2 the actuator 6 may comprise an influence part 7 in the form of a piezoelectric crystal. In case the actuator 6 comprises an influence part 7 in the form of a piezoelectric crystal the piezoelectric crystal is arranged so that it influences the wall 2 with a force in the plane of the wall 2. The vibration sensor 9 is preferably arranged on the piezoelectric crystal in this case.

During operation of the measurement devices in FIG. 1 and FIG. 2 the control unit applies a predetermined drive signal to the actuator and receives a measurement signal from the vibration sensor 11. Starting from the predetermined drive signal and the measured vibration signal the control unit 10 determines a system response in the form of an impulse response. The impulse response has the form of a reading as a function of time. In the impulse response the amplitude at the point of time 2 ms is measured and is compared with the amplitude at 2 ms in at least one earlier measured impulse response with a known liquid level in the container 1. From the comparison a determination is made regarding the liquid level in the container. The control unit may for example determine whether there is liquid in the container 1 at the level on which the actuator is placed.

If there is liquid at the level on which the actuator is placed the control unit may send out a warning signal to other equipment which is connected to the control unit or directly send out a sound or light signal. Then there is sewage up to the level of the actuator and it is time to empty the container 1.

Figure 3:
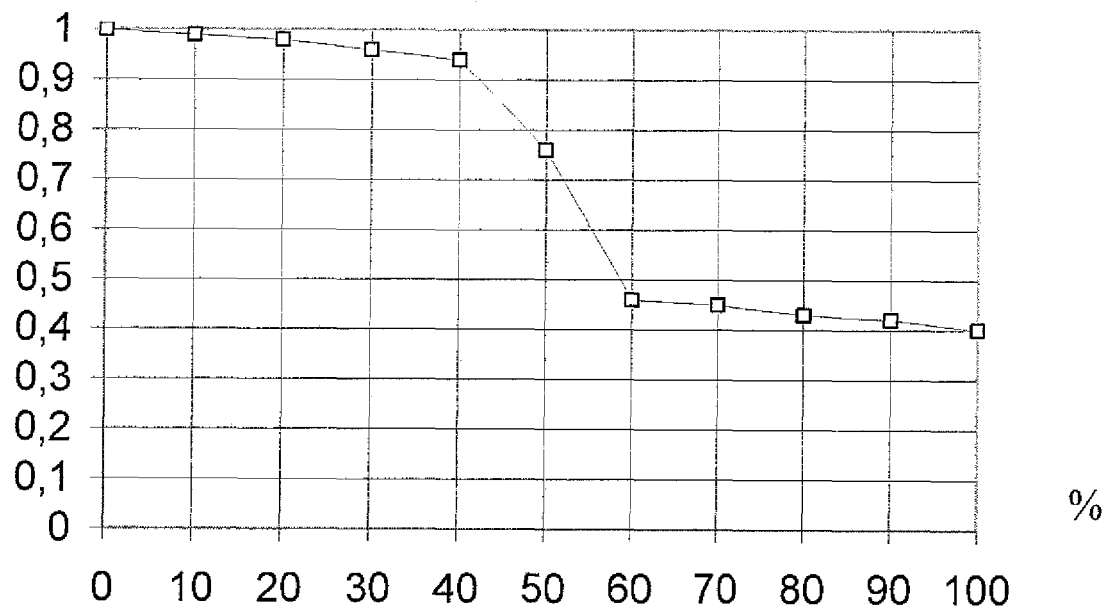
FIG. 3 shows the amplitude of the impulse response, measured at different heights on the container, as a function of the filling level in the container.

FIG. 3 shows the mean value of the amplitude of the system response in the form of the impulse response in the interval 0-2 ms, as a function of the liquid level in the container 1 in percent of maximum liquid level, with the actuator placed at 50% liquid level in the tank. As is evident from FIG. 3 there is a big difference in amplitude when the liquid level is at 40% compared with when the liquid level is at 60%. Preferably the measurements that are shown in FIG. 3 are performed in order to be used as reference when the measurement device is to be used in a real measurement case. Alternatively, a measurement with only an empty container may be made as reference. In the first case the liquid level is assumed to be at the actuator when the mean value of the amplitude reaches the amplitude value for the liquid level at the actuator measured at the reference measurement.

As is evident from FIG. 3 there is a small slope on the curve except in the region when the liquid level passes the level of the actuator 6. This makes it difficult to determine the liquid level in the container when the liquid level is not close to the level of the actuator. It may however, be possible for some placements of the actuator 6 to determine the liquid level at arbitrary levels using the curve that is shown in FIG. 3.

Figure 4:
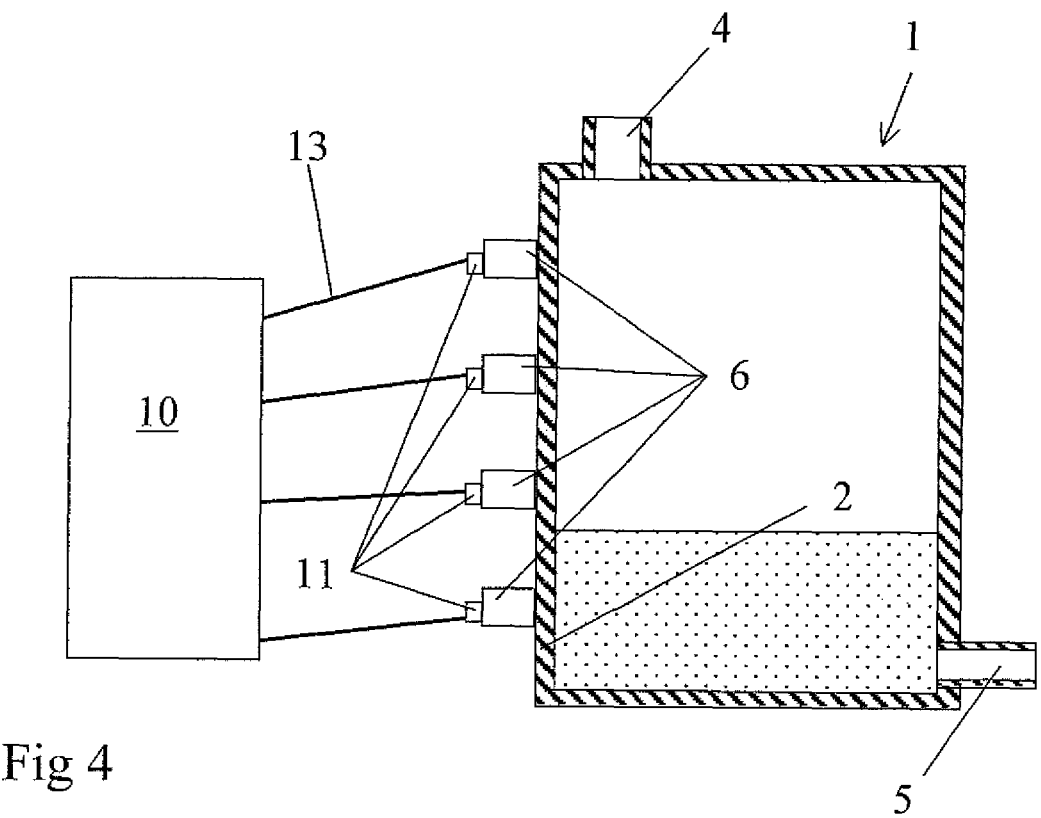
FIG. 4 shows schematically a container with a device for determination of the liquid level according to an alternative embodiment of the present invention.

FIG. 4 shows schematically a container with a measurement device for determination of the liquid level according to an alternative embodiment of the present invention. In FIG. 4 the measurement device comprises a plurality of actuators 6 in the form of piezoelectric crystals and corresponding vibration sensors 11. With a measurement device according to the embodiment in FIG. 4 each one of the actuators 6 and the corresponding vibration sensor 11 is used to determine whether the liquid level is over or under the level of the actuator 6. It is thereby possible to determine which actuator 6 that is arranged closest to the liquid level. By the level for the current actuator 6 being known the liquid level in the container 1 may be determined.

Figure 5:
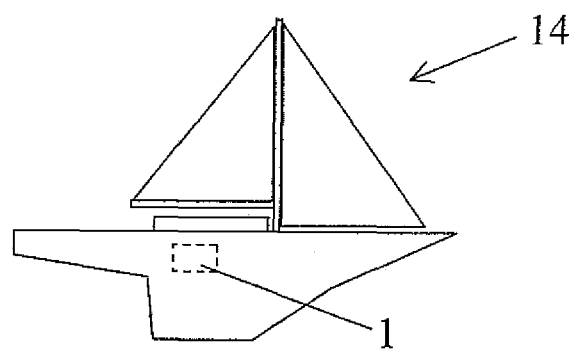
FIG. 5 shows schematically a pleasure boat according to an embodiment of the present invention.

FIG. 5 shows schematically a pleasure boat 15 according to an embodiment of the present invention, which pleasure boat comprises a container 1 with a measurement device (not shown) according to the invention.

Figure 6:
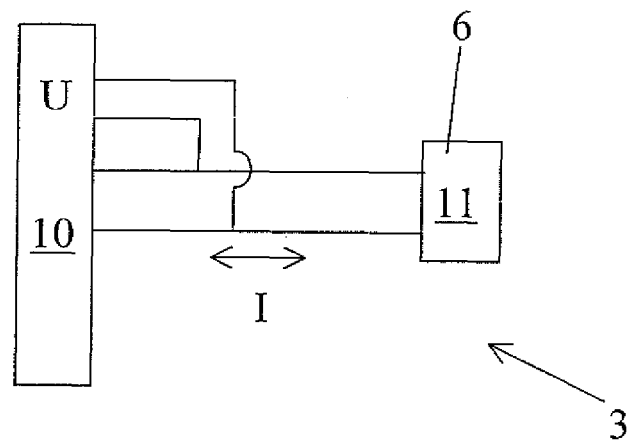
FIG. 6 shows schematically a measurement device for determination of the liquid level according to an alternative embodiment of the present invention.

FIG. 6 shows schematically a measurement device 3 for determination of the liquid level according to an alternative embodiment of the present invention. The measurement device 3 comprises a control unit 10 and an actuator 6 in the form of a piezoelectric crystal which also comprises vibration sensor 11. The control unit 10 is arranged to measure current I to the actuator/vibration sensor 6, 11, as well as the voltage U over the actuator/vibration sensor 6, 11, at the same time as the control unit feeds a drive signal to the actuator 6. From the current I and the voltage the control unit 10 determines the electrical impedance of the piezo which is considered as a system response.

The drive signal that is used to drive the actuators may have many different forms. Preferably a drive signal with a frequency content in the interval 100-1200 Hz is used to drive an actuator 6 which comprises an influence part 7 and a movement part 9 which moves in relation to the influence part 7.

With advantage a drive signal with a frequency content in the interval 300-18000 Hz is used to drive an actuator 6 which comprises an influence part 7 in the form of a piezoelectric crystal.

The above described embodiments are only to be regarded as non-limiting examples which may be modified and amended in many ways without departing from the spirit and scope of the present invention which is limited only by the appended claims.

It is for example possible to use other types of actuators, which are know to men skilled in the art in order to induce vibrations and measure vibrations.

The invention claimed is:

1. A measurement device for determination regarding the liquid level in a container with a wall, which measurement device comprises at least a first actuator arranged on a corresponding level on the wall, which actuator comprises an influence part which is arranged for influencing the wall on the outside of the container, a vibration sensor for each one of said at least one actuator, for measurement of the vibrations in the wall, and a control unit, which is connected to said at least one actuator and the vibration sensors, and which is arranged to apply to the actuators a predetermined drive signal which makes the influence part to influence the wall with an oscillating force, wherein the vibration sensors are arranged fixed in relation to the corresponding influence part so that the vibration sensors moves in the same way as the influence part, wherein the measurement device is arranged to receive at least one resulting measurement signal from each one of the vibration sensors, which measurement signals depends on the size of the vibrations, and to compare the measurement signals with earlier measured measurement signals in order to make a determination regarding the liquid level in the container, wherein the control unit is arranged to determine a system response for the container using the predetermined drive signal and the measured measurement signals and to make a determination regarding the liquid level in the container starting from the determined response and at least one earlier measured response with a known liquid level, wherein the system response is an amplitude response containing at least two natural resonance frequencies.

2. A measurement device according to claim 1, wherein the amplitude of the system response is used to make a determination regarding the liquid level in the container.

3. A measurement device according to claim 2, wherein the amplitude of the system response during a predetermined interval is used to make a determination regarding the liquid level in the container.

4. A measurement device according to claim 3, wherein the system response is comprised of the impulse response and wherein said predetermined interval is from the beginning of the impulse response until between 0.5 and 20 milliseconds into the impulse response, preferably 1-10 milliseconds into the impulse response and most preferred 1-5 milliseconds into the impulse response.

5. A measurement device according to claim 1, wherein the actuator is arranged to influence the wall with a force perpendicular to the wall.

6. A measurement device according to claim 5, wherein the actuator comprises a movement part which is arranged to move in relation to the influence part in order to give rise to vibrations.

7. A measurement device according to claim 6, wherein the influence part comprises an electromagnet in the magnetic field of which the movement part is arranged to move.

8. A measurement device according to claim 1, wherein the actuator is arranged to influence the wall with a force parallel to the wall.

9. A measurement device according to claim 8, wherein the influence part comprises a piezoelectric crystal.

10. A measurement device according to claim 1, wherein the vibration sensor is an accelerometer.

11. A measurement device according to claim 10, wherein the measurement signal is a voltage over the accelerometer.

12. A measurement device according to claim 10, wherein the vibration sensor is comprised of the influence part in the form of the piezoelectric crystal.

13. A measurement device according to claim 12, wherein the measurement signals are comprised of the current to the piezoelectric crystal and the voltage over the piezoelectric crystal.

14. A measurement device according to claim 1, wherein the determination regarding the liquid level in the container is a determination of whether there is liquid in the container at the level on the wall on which one of said at least one actuator is arranged.

15. A measurement device according to claim 1, wherein the determination regarding the liquid level in the container is a determination of the liquid level in the container.

16. A measurement device according to claim 1, comprising a plurality of actuators which are arranged to be fastened at different heights on the wall of the container.

17. A measurement device according to claim 16, wherein the determination regarding the liquid level in the container is a determination of which actuator that the liquid surface is closest to.

18. A container on which there is arranged a measurement device according to claim 1.

19. A septic tank on which there is arranged a measurement device according to claim 1.

20. A pleasure boat comprising a septic tank on which there is arranged a measurement device according to claim 1.

21. A method for determination regarding the liquid level in a container with a wall, comprising:
   applying to an actuator, which is arranged on the wall on the outside of the container, a predetermined drive signal which makes the actuator to influence the wall with an oscillating force in at least one point on the wall;
   measuring at least one measurement signal which is a measure of vibrations in the wall in said at least one point;
   calculating the system response for the container starting from the vibration at least one measurement signal; and
   comparing the at least one measurement signals with earlier measured measurement signals in order to make a determination regarding the liquid level in the container starting from the system response, wherein the system response is an amplitude response containing at least two natural resonance frequencies.

22. A method according to claim 21, wherein the determination regarding the liquid level in the container is made starting from the amplitude of the system response.

23. A method according to claim 22, wherein the amplitude is based on the amplitude during a predetermined interval of the system response.

24. A method according to claim 23, wherein the system response is comprised of the impulse response and wherein said predetermined interval is from the beginning of the impulse response until between 0.5 and 20 milliseconds into the impulse response, preferably 1-10 milliseconds into the impulse response and most preferred 1-5 milliseconds into the impulse response.

25. A method according to claim 21, wherein the actuator influences the wall with a force perpendicular to the wall.

26. A method according to claim 21, wherein the drive signal has a frequency content in the interval 100-1200 Hz.

27. A method according to claim 21, wherein the actuator comprises an influence part in the form of a piezoelectric crystal.

28. A method according to claim 27, wherein the drive signal has a frequency content in the interval 300-18000 Hz.

* * * * *